United States Patent [19]

Moore

[11] 4,123,209

[45] * Oct. 31, 1978

[54] BRIQUETTING PLANT

[76] Inventor: James E. Moore, 1401 Meadow La., Glenview, Ill. 60025

[ * ] Notice: The portion of the term of this patent subsequent to Mar. 28, 1995, has been disclaimed.

[21] Appl. No.: 788,639

[22] Filed: Apr. 18, 1977

[51] Int. Cl.[2] .......................... B29B 3/00; B29B 1/00

[52] U.S. Cl. ...................................... 425/74; 425/135; 425/143; 425/145; 425/147; 425/149; 425/197; 425/222

[58] Field of Search ............... 425/145, 149, 143, 144, 425/147, 197, 222, 363, 135, 74

[56] References Cited

U.S. PATENT DOCUMENTS

| | | | |
|---|---|---|---|
| 2,514,616 | 7/1950 | Adams | 425/222 X |
| 2,843,874 | 7/1958 | Wood | 425/147 X |
| 3,017,662 | 1/1962 | Marsh | 425/222 X |
| 3,743,461 | 7/1973 | Williams | 425/222 X |

FOREIGN PATENT DOCUMENTS

| | | | |
|---|---|---|---|
| 681,941 | 3/1964 | Canada | 425/222 |

*Primary Examiner*—Robert L. Spicer, Jr.
*Attorney, Agent, or Firm*—Leydig, Voit, Osann, Mayer & Holt, Ltd.

[57] ABSTRACT

A briquetting plant for hot briquetting particulate matter, such as mill waste containing a material that softens when heated, such as iron oxide, which includes a low temperature tumbler type heat exchanger, an intermediate temperature tumbler type heat exchanger, a fluid bed furnace and a compactor, with the feed material being fed therethrough in succession. The briquettes produced by the compactor are first fed from the outlet of the compactor into the intermediate temperature heat exchanger, for liberation of heat therein, separated from the feed material by a screen at the outlet of the intermediate temperature heat exchanger and from such screen transported into the low temperature heat exchanger for further imparting of heat to the feed material. A second screen is provided at the outlet of the low temperature heat exchanger for separating and discharging the briquettes in relatively cooled form. The tumbler type heat exchangers are in the form of a hollow cone having a wide included angle enclosed by a cover and slowly rotated about an inclined axis to provide intimate mixing of the components and uniform withdrawal of the mixture. The heat exchangers are mounted at a low level and the screens are mounted at a high level with bucket type elevators in between and with the furnace and compactor being located at successive intermediate levels so that, except for the two bucket elevators, all of the flow in the plant takes place under action of gravity. Wet and dry feed materials are separately handled, with means being provided for conveying the dry feed directly to the second heat exchanger.

37 Claims, 8 Drawing Figures

BRIQUETTING PLANT

BACKGROUND OF THE INVENTION

In the operation of steel mill and similar production facilities large tonnages of rejected screenings and waste are produced in the form of ore fines, furnace dusts, water treatment plant sludges, grindings, borings, scarfings, coke fines, mill scale, slags, and other materials containing valuable constituents, such as iron oxide and combustible elements, which range in size from sub-micron to as large as three-eighths inch but which are too finely divided to feed into a melting furnace. The feeding of such fine materials causes them to be blown out of the combustion zone before melting or chemical conversion can take place.

Thus it has been recognized for many years that if such screenings and wastes are to be utilized to recover their constituents including any fuel value which they contain, it is necessary to form the materials into agglomerated form.

In the past agglomeration of ores, concentrates, screenings and wastes has been accomplished by one or more of three procedures: pelletizing, sintering and briquetting.

Both pelletizing and sintering require a high plant investment and have high operating costs. Because of the large scale on which such processes must be carried out and the large quantities of air and other gases which must be handled, pelletizing and sintering are not well suited to utilization of the more limited quantities of waste and rejected screenings available at many plant locations. The pelletizing and sintering plants now in use require large amounts of fuel, sintering plants being particularly inefficient in the use of fuel. Also, both processes require complete combustion of non-volatile combustible matter in the material being processed. Objectionable volatile matter, such as the oil frequently present in mill scale and water plant sludges, can present serious pollution problems due to its presence in the gases evolved from pelletizing and sintering plants.

With respect to briquetting, the process has received only limited acceptance. Agglomeration at low temperature by compaction without binders produces a fragile briquette and the use of binders is too expensive for most applications. Cold-bonded briquettes usually are not acceptable as a furnace feed material because they tend to disintegrate within the furnace prior to melting. Hot briquetting, on the other hand, has not reached a mature state of development or gained acceptance because large quantities of ore fines have been generally available at the steel mills for mixing with the wastes, so that large sintering plants using well-known processing techniques could be built and operated economically. With the advent of pelletizing plants located at the mine sites to process the ore fines and concentrates, and with the increased cost of energy and pollution controls for sintering plants, it is no longer economical to construct sintering plants at most mill sites, and many existing sintering plants have been shut down for these reasons.

It is, accordingly, an object of the present invention to provide a plant, or system, capable of accepting a wide variety of feed materials, such as rejected screenings, mill wastes, ore fines, ore concentrates and other materials having heat-softenable constituents, and capable of reliably forming such materials into highly durable briquettes, by hot briquettes which will hold together during the handling, feeding and smelting process as, for example, in a blast furnace, for melting and chemical conversion and without reverting to fines or flue dust.

It is another object of the present invention to provide a hot briquetting plant for such feed materials which is highly economical, requiring a relatively low initial investment as compared to other plants intended for the same purpose and with low maintenance and operating costs.

It is a more specific object of the present invention to provide a hot briquetting plant for steel mill screenings and waste which utilizes, efficiently, as a source of heat, the carbon and other combustible elements which form a proportion of the waste materials, by novel use of heat exchangers. In this connection it is an object to provide a hot briquetting plant which requires only a minimum of expensive auxiliary fuel such as gas, oil or coal, utilizing such auxiliary fuel only during start-up and as might be required from time to time when processing waste having an unusually low proportion of combustion supporting materials. In this connection, also, it is an object to provide a briquetting plant in which materials are largely fed by gravity, due to the novel construction of the plant, and which requires only a relatively small amount of conveying equipment and a minimum of mechanical energy.

It is still another object of the present invention to provide a hot briquetting plant which is readily automated and which is capable of operating stably and continuously with a minimum of supervision and man power.

It is a further object of the invention to provide a hot briquetting plant which is not dependent upon large scale operation and in which the component equipment may be scaled down in size and capacity without a corresponding reduction in efficiency, making the design of plant suitable for use on a continuous basis to process materials for small, as well as large, industrial operations.

It is yet another object of the invention to provide a hot briquetting process which inherently produces a minimum of effluent gases and in which the quantity and type of gases are such as to be processed using low cost anti-pollution equipment as necessary to meet local pollution standards.

It is a related object to provide a plant which is compact and which utilizes variable output feeders and conveyors for controlling flows to and throughout the plant so that the storage capacity required within the system is small and can be included within the heat exchangers and the furnace, thereby avoiding any need for separate in-plant storage vessels.

Other objects and advantages of the invention will become apparent upon reading the attached detailed description and upon reference to the drawings in which:

FIGS. 1 and 1*b* comprise an elevational view, in partial section, of a briquetting plant construction in accordance with the present invention.

While the invention has been described in connection with certain preferred embodiments, it will be understood that I do not intend to be limited by the disclosed embodiments but intend to cover, on the contrary, the various alternative and equivalent constructions included within the spirit and scope of the appended claims.

Figure 1A:
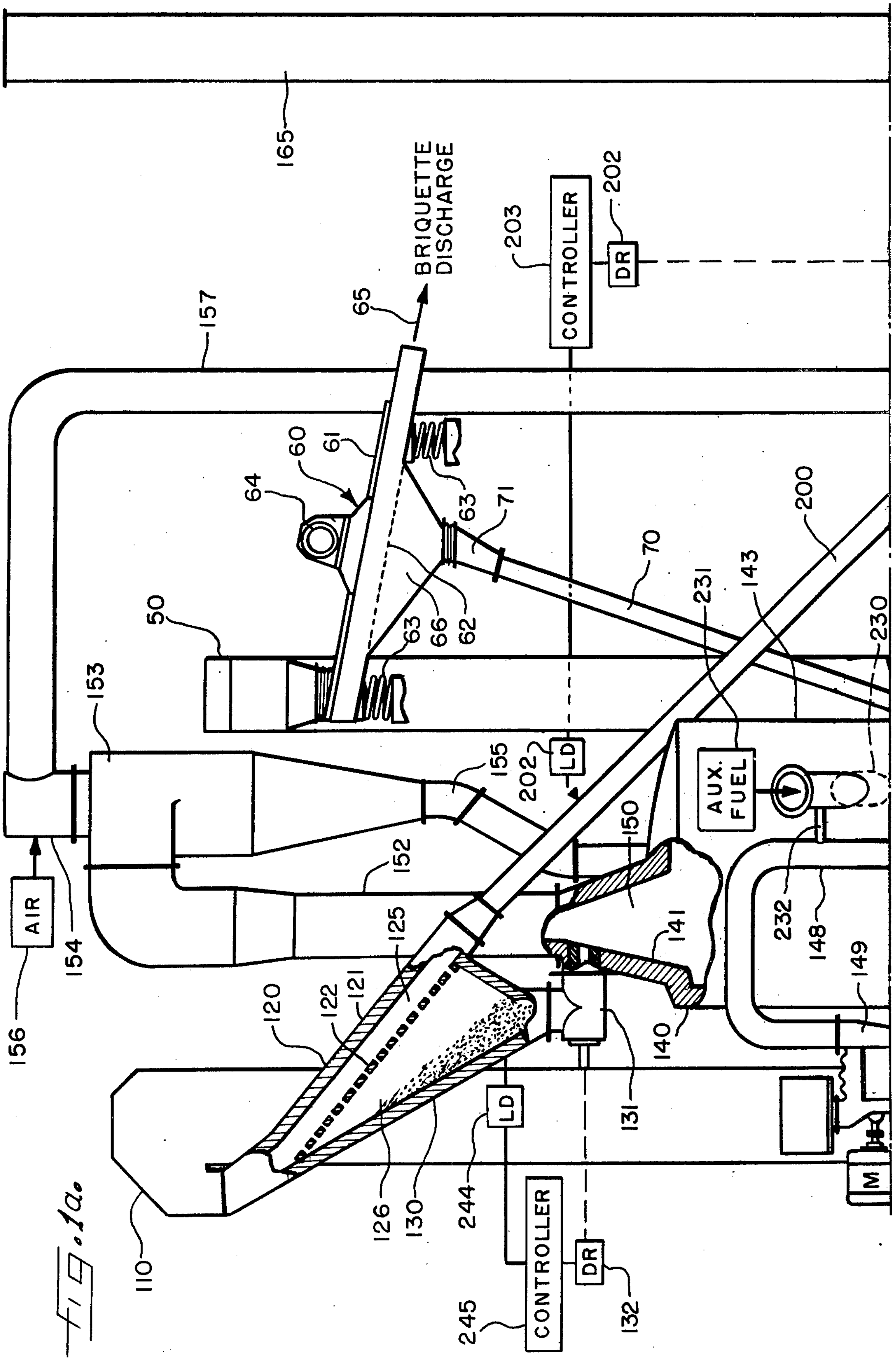
Figure 1B:
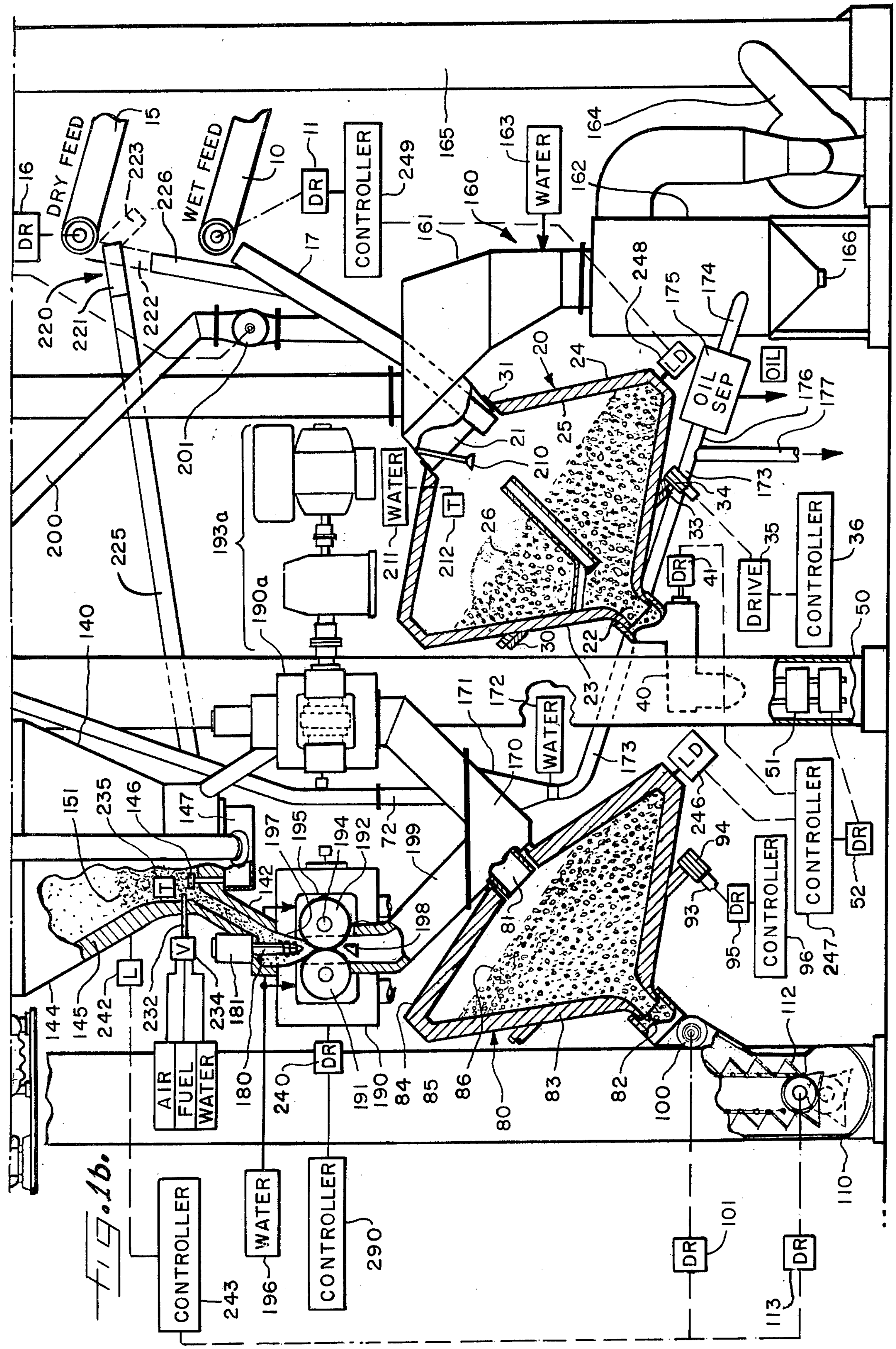

Turning now to FIG. 1 a preferred form of briquetting plant designed to process a variety of steel mill wastes and screenings is shown, of which the components will be understood to be mounted upon a supporting framework which, for the sake of simplicity, has been omitted from the drawings. At the right-hand side of the plant is a wet feed conveyor belt 10 having a drive 11 for bringing into the plant feed material containing iron, primarily in the form of iron oxide, and combustible elements, the latter predominantly carbon. The materials are referred to as "wet" since they contain filter cake or mill scale or have been taken from outside storage piles where large amounts of water, resulting from precipitation, are normally absorbed. Means are provided, also, for bringing "dry" waste into the plant, such as dust which has not been stored out of doors but which arrives directly from current steel mill operations. For transporting this material into the plant a dry feed conveyor 15 is used having a drive 16. Discussion of the flow of the dry feed component will be reserved to a later point.

The discharge from the wet feed conveyor belt 10 is conducted by an inlet chute 17 into a first, or low temperature, heat exchanger 20 which is of the constantly rotating tumbler type. The heat exchanger has an axial inlet 21 at the top and an axial outlet 22 at the bottom, the inlet and outlet being provided with seals to make the unit as nearly as possible gas tight. The heat exchanger in its preferred form is of double conical shape having a lower hollow conical container 23 and which is enclosed by a cover 24 which may also be of conical shape. For the details of such a conical heat exchanger-tumbler reference may be made to my co-pending application Ser. No. 788,638 filed Apr. 18, 1977, now U.S. Pat. No. 4,106,114. It will suffice, for the present, to say that the heat exchanger has a refractory lining 25 and is supported for rotation about its axis by a single large annular bearing 30 within which the lower cone section is mounted, the axis defined by the bearing being inclined at an angle of approximately 45° but which may vary between about 35° and 55°. As a result of rotation and inclination materials entering at the inlet are constantly cascaded, and thus evenly distributed, over the surface 26 of the contained load. A further advantage of the inclination is that materials are drawn from the outlet 22 from over a wide range of positions within the exchanger. The operation may be contrasted with that of an hour glass in which the grains are fed primarily along a fixed line which extends vertically upwardly from the constriction. In the present heat exchanger-tumbler the vertical line extending through the mass of material within the device constantly orbits so that the material drawn from the exit is not drawn from any one particular location so that a mixing occurs which not only equalizes the composition flowing through the outlet but in addition greatly improves the efficiency of the heat exchange. The unit is preferably driven by means of teeth formed into the outer ring of the bearing 33 which are engaged by the teeth of a pinion 34 connected to a drive 35 having a control 36 which is capable of adjusting the speed from a portion of a revolution to several revolutions per minute, for example, from 0.2 to 2.0 rpm. In carrying out the invention the heat exchanger 20, in addition to receiving flow of feed material also receives a flow of hot, freshly made briquettes, the purpose of the heat exchanger being to pre-heat the feed material and, at the same time, to cool the briquettes to a safe discharge temperature. However, a discussion of briquette production and path of flow will be temporarily deferred.

The mixture of briquettes and feed which is fed from the outlet 22 of the heat exchanger 20 passes into a screw type feeder 40 having a drive 41, the feeder serving to load an elevator 50 having chain supported buckets 51 driven by a drive 52. While the drive is shown for convenience at the lower end, it is desirable, in fact, to have the drive at the upper end. At the upper end of the elevator the buckets are emptied into a totally-enclosed screen assembly 60, which is preferably of the vibratory type having a frame 61 mounting a screen 62 and supported on resilient mounts 63. An electric motor-driven vibrator 64, which is preferably of the eccentric type, causes the frame, and the screen 62 which it contains, to vibrate resulting in efficient separation of the briquettes which flow along a path 65 on the upper side of the screen, from which they are discharged from the plant, and the heated feed material which flows through the screen along a path 66.

The heated feed material is conducted downwardly through a first feed tube 70 having an upper end 71 and a lower end 72 which feeds into the second, or intermediate temperature, heat exchanger 80 to be discussed.

The heat exchanger-tumbler 80 is similar to the heat exchanger 20 previously described having a sealed inlet 81 and a sealed outlet 82, with the vessel being formed by a hollow conical receptacle 83 enclosed by a cover 84. The receptacle has a refractory lining 85. The heat exchanger is supported upon a bearing 93 having teeth driven by a pinion 94 which has a drive connection with the heat exchanger drive 95 having a controller 96.

At the outlet of the heat exchanger 80 is a screw feeding device 100 powered by a drive 101 for the feeding of material at a controlled rate into an elevator 110 having a series of chain supported buckets 112 driven by a drive 113. The elevator buckets are dumped into a screen assembly 120 having a gas-tight housing 121 and a stationary screen 122 of the inclined "grizzly" type, with the briquettes flowing over the top of the screen along path 125 and the heated feed materials falling to a position 126 below the screen which feeds a hopper 130. At the bottom of the hopper is a screw type feeding device 131 having a drive 132.

From the hopper 130 the heated feed material is discharged into a furnace 140 of the fluid bed type, the furnace having an inlet 141 at its upper end and outlet 142 at its lower end. The furnace, in its preferred form, has an upper cylindrical portion 143 and a lower conical portion 144 lined with a layer 145 of refractory material (FIG. 1*a*). The bottom of the furnace has multiple air inlets 146 and an air plenum 147 underlying the inlets. The plenum receives pressurized air through a line 148 leading from a blower 149 driven by a motor M. The bed of material, indicated at 151, at the bottom of the furnace is fluidized by the air which flows upwardly through the inlets, as is characteristic of a fluid bed, resulting in efficient burning of combustible elements in the feed.

In accordance with one of the more detailed aspects of the present invention the off gases resulting from the combustion are conducted upwardly through the inlet opening 141 and past the point of discharge of the feeder 131 which feeds material into the furnace to provide a feed/gas heat exchanger 150. Moreover, the inlet 141 is sufficiently restricted so that the off gases have a sufficient velocity as they pass the point of feeder discharge so a substantial portion of the discharged material is conducted upwardly and maintained in contact with the high temperature off gases thereby recovering waste heat, which raises the temperature of the waste to more nearly that of the furnace. The remaining coarser and more abrasive material discharged by feeder 131 falls into the furnace, counter current to the gas, also aiding in heat recovery from the gas. The off gases and the entrained particles are conducted into a vertical stack 152 and into a known cyclone type separator 153 having an upper discharge 154 for the gases and a downwardly extending convergent discharge 155 containing a trickle valve (not shown) for returning the entrained particles of waste back into the furnace. In addition to recovering heat, the feed/gas heat exchanger causes a reduction in the internal temperature of the cyclone separator which tends to become plugged when operated at furnace bed temperature. If desired, air may be injected into the upper outlet port of the separator, as indicated at 156 for the purpose of completing the oxidation of carbon monoxide and any unburned hydrocarbons. The off gas then flows through a duct 157 downwardly into a scrubber assembly 160 having an upper, or manifold, section 161 and a lower section 162. The manifold is positioned over the inlet opening 21 of the first heat exchanger 20 so as to receive, also, the off gases from the heat exchanger. Water is sprayed into the gaseous stream as indicated at 163 to purify the gases and to remove any entrained particles, following which the stream of gas is sucked into a blower 164 which discharges into an upstanding flue or stack 165. The solid particles, in the form of a slurry, are drawn from a discharge port 166 at the lower end of the scrubber assembly.

With regard to the off gases from the second, or intermediate temperature, heat exchanger 80, these pass through a manifold 170 and a small scrubber 171, supplied with water 172. The effluent gases, oil, water and solids are conducted by means of a duct 173 for injection, at 174, in the lower portion 162 of the aforementioned scrubber. Scrubber 171 may be in the form of a jet-type venturi eductor, using water 172 at high pressure to provide the efficiency necessary to remove the oil vapors from the gas. Preferably interposed in the duct 173 is an oil separator 175 which removes the oil condensed from the off gas and which is desirable in the case of particularly oily feed materials. The duct 173 also includes a divertor 176 so that the off gas from the second heat exchanger, instead of being sent to the scrubber, may be directed back into the furnace via a line 177.

Turning attention to the furnace, the combustible elements in the material 151 at the bottom of the furnace are largely burned away to leave a residue of iron oxide-containing material at a temperature of incipient fusion which may be on the order of 1800° F., such materials passing through the outlet 142 of the furnace to engage a feeder 180 having a drive 181 which controls the rate of flow into a roll type compactor 190. The latter has a pair of pocketed rolls 191, 192 rotating in opposition to one another and driven by a drive motor 193. The compactor has an inner housing 194 enclosing the high temperature zone between the feed inlet 197 and the product outlet 199 and an outer housing 195 with a source of water 196 which is sprayed onto the rolls, between the housings, and at other strategic points, to maintain the temperature at a safe level for the machine. The exiting briquettes, interconnected by "flash", are broken apart by a breaker 198 located at the output nip.

A second compactor is employed in parallel with the first and carries the same reference numerals followed by suffix *a*. The two compactors discharge through outlets 199 and 199*a* into the manifold 170 from which the briquettes flow into the inlet opening 81 of the second heat exchanger 80.

In this second heat exchanger the briquettes mix with the partially pre-heated feed material flowing through the feed tube 70 from the underside of the first screen assembly 60.

Thus the briquettes, in the second heat exchanger, lose a portion of their high furnace heat to the feed material. The heat exchange is continued to the point of near-equalization as the mix is transported upwardly in the buckets of the second elevator 110.

Following separation in the second screen assembly 120, the briquettes, flowing along the upper side of the screen, pass into a downwardly angled feed tube 200 having a feed gate 201 at the lower end thereof which is driven by a drive motor 202. In accordance with one of the more detailed aspects of the invention the feed tube 200 is kept substantially full of briquettes so that they are lowered gently to the point of discharge rather than falling freely through the tube. This is accomplished by providing a level detector 202 at the upper end of the tube which produces an output signal feeding a controller 203 so that the drive 202 is actuated, causing discharge at the gate 201, only when the level of the briquettes in the tube is above the level of the detector. As will appear, level detectors, and associated controllers are utilized for control purposes at a number of points in the plant and it will suffice to say that while the invention is not limited to use of any particular type of detector, it is preferred to employ a detector which utilizes gamma rays and which may thus be mounted externally of the device with which it is used. Such level detectors and associated control equipment are commonly used and are available as standard equipment from a number of suppliers. The gamma ray source, level detector and associated electronic equipment may, for example, be of catalog types 7063, 7002 and 7311, respectively, manufactured by Kay Ray, Inc. of Arlington Heights, Illinois and the controller may be of catalog type GS 2A4A manufactured by The Foxboro Company of Foxboro, Massachusetts.

The partially cooled briquettes are fed from the lower end of the feed tube 200 into the inlet 21 of the first heat exchanger 20 where they are mixed with the incoming wet feed material which is fed into the plant on conveyor 10. In the first heat exchanger 20 the intimate mixing which occurs as the heat exchanger revolves, and as the material cascades upon the surface of the charge, brings about an approximate equalization of temperature, which is continued as the mix of briquettes and feed material is fed, by feeder 40, into the buckets of the first elevator 50. Separation and discharge of the briquettes occurs in the screen assembly 60, with the briquettes passing along the top of the screen and with the now pre-heated feed material being discharged into the first feed tube 70 which leads to the second, or intermediate temperature, heat exchanger as previously discussed.

In order to insure that the temperature in the first heat exchanger is kept below the temperature at which any oil contained in the feed will vaporize, a water spray head 210 is provided in the first heat exchanger coupled to a source of water 211 which is under the control of a temperature detector 212. In short, whenever the detector reaches a temperature greater than a set value, water is sprayed in automatically to reduce the temperature to a safe level. Thus most of the oil contained in the feed remains in the feed until vaporized at the higher temperature existing in the second heat exchanger 80 and following which the oil is preferably removed from the system by the oil separator 175.

The above discussion has traced a charge of wet feed material through the plant. If desired, all of the feed, either wet or dry, may be caused to follow the same paths but, in accordance with one of the aspects of the present invention, the dry feed material entering on conveyor 15 powered by drive 16, is fed directly to the second heat exchanger 80. Preferably there is provided at the output of the drive feed conveyor a shiftable director 220 having a normal position 221, an alternate position 222 and a third position 223 which may, for example, be used on start-up. In the normal position the dry feed material passes through a conduit 225 which leads to the second heat exchanger. In the alternate position 222, in which the dry feed is combined with the wet, the dry feed is led through a conduit 226 to the first heat exchanger. In the third position 223 the director directs the dry feed intake directly to the furnace by means of a conduit (not shown).

Under conditions of start-up an auxiliary burner 230 for the furnace 140 is used which may, for example, receive gas or oil from an auxiliary source 231 and air from a line 232 leading from the blower 149. In addition, an inlet tube 233 having a three-way valve 234 is provided for injecting fuel, water or purge air directly into the fluidized bed when needed to control the bed temperature, automatically, by temperature sensor 235 and controller 236. In a plant having little or no fuel in its feed supply, coke fines may be added to the feed, powdered coal may be fed into the bed by a screw conveyor (not shown) or oil or gas may be injected directly into the bed through one or more fuel inlet tubes, of the type shown, in accordance with standard techniques.

Figure 2:
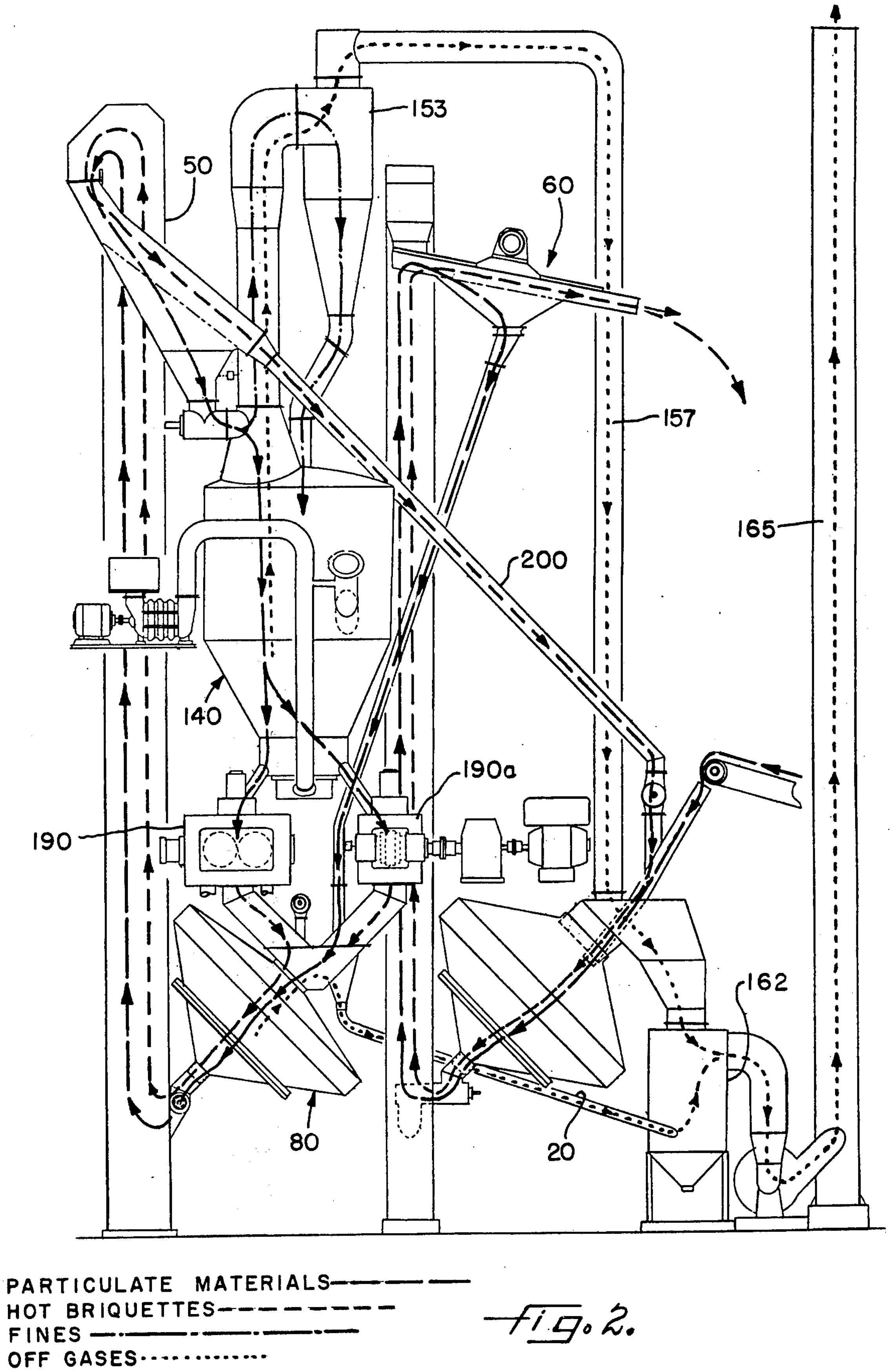
FIG. 2 is a view similar to FIG. 1 but with superimposition of flow lines indicating the paths taken by the materials flowing within the plant.
Figure 3:
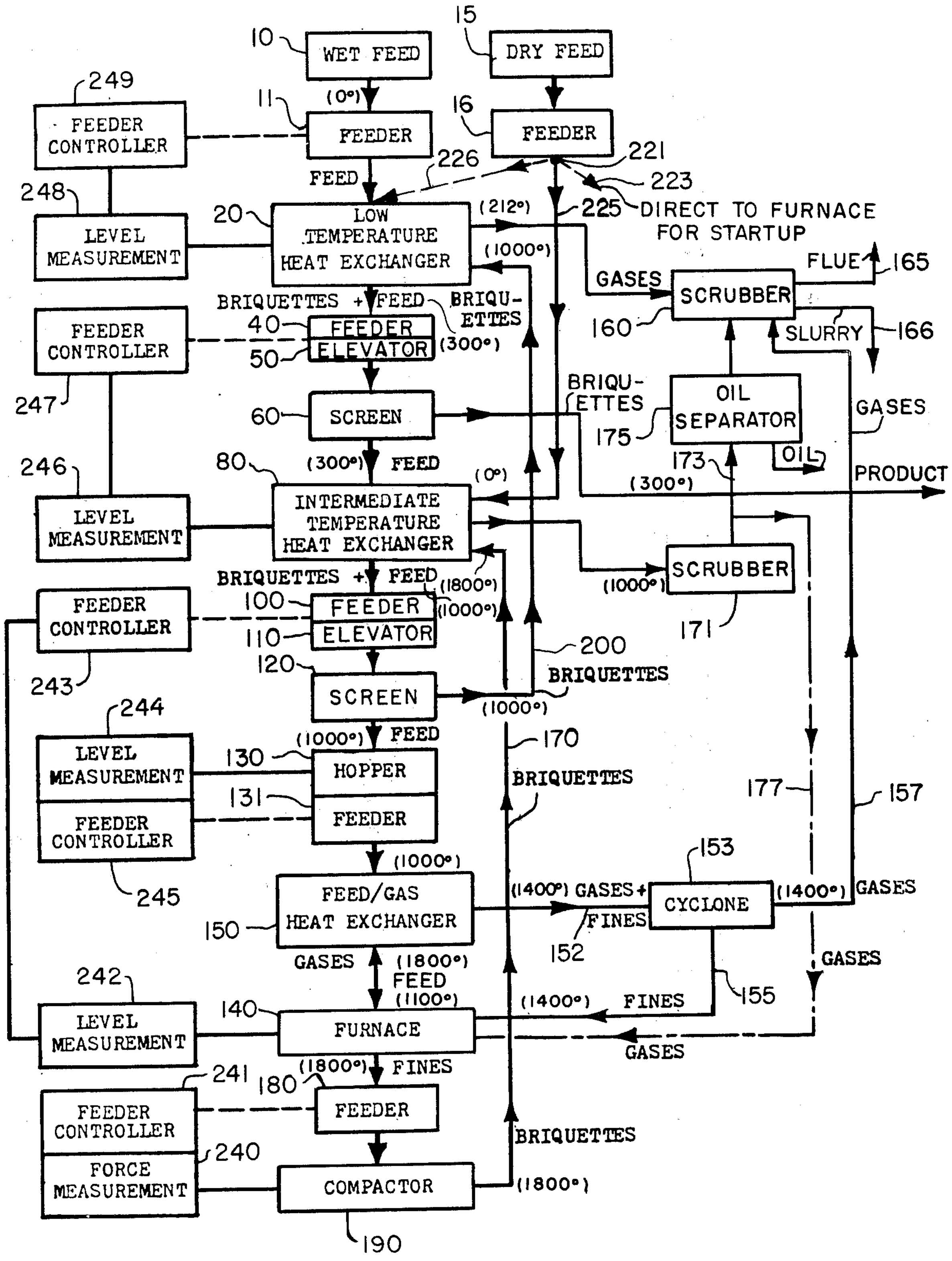
FIG. 3 is a block type flow diagram corresponding to FIGS. 1 and 2.

With the construction of the plant in mind, reference may be made to FIGS. 2 and 3 for a more detailed understanding of the operation. In FIG. 2 the paths of flow of the feed materials, the hot briquettes, the recycled fines and the off gases have been superimposed, in coded form, upon the drawing, whereas in FIG. 3 the flow of such materials has been set forth in a flow diagram. The flow of the wet feed material 12 takes place vertically down the center of the sheet to the compactor at the bottom. Thus the material from the wet feed conveyor 10 flows successively through the low temperature heat exchanger 20, the feeder 40, the shaker screen 60 into the intermediate temperature heat exchanger 80. From the latter, flow continues through the feeder 100, screen 120, hopper 130, feeder 131, the heat exchanger 150 into the furnace 140. From the furnace the residue, heated to incipient fusion, is fed via feeder 180 into the compactor 190 where the briquettes are formed.

The hot briquettes, after compaction, are caused to flow in a heat exchange path which is counter to the flow of the waste material. That is to say the briquettes are conducted from the compactor 190 along path 170 into the intermediate heat exchanger. In this heat exchanger the briquettes, at an entering temperature of approximately 1800° F., encounter the feed which has been pre-heated, in the first heat exchanger, to a temperature of approximately 300° F. The resulting mix, which is conveyed through feeder 100 and up elevator 110 to the screen 120 achieves a near-equilibrium temperature which is on the order of 1000° F. The briquettes flowing along the top of the screen in the screen assembly 120 are lowered through the feed tube 200 to enter the low temperature heat exchanger at a temperature of 1000° F. Here the briquettes are joined by the wet feed from conveyor 10 which is at an assumed temperature of 0° F. The mix exiting from the low temperature heat exchanger 20 and elevated by the elevator 50 reaches an equilibrium temperature of approximately 300° F. which is then the temperature of the briquettes at the point of discharge 65. The out gas from the low temperature heat exchanger, because of the spraying of water from the spray head 210, is at a somewhat lower temperature, namely, 212° F. as it is fed into scrubber 160. Furnace off gas passes through feed/gas heat exchanger 150, cyclone 153 to scrubber 160 by way of conduits 152 and 157. Fines from the cyclone flow through tube 155 to the furnace. Gas from the intermediate temperature heat exchanger 80 flows into scrubber 171 and then into scrubber 160 directly or by way of oil separator 175. Alternatively, the gases from scrubber 171 may be piped into the furnace for combustion of any fuel content.

AUTOMATIC FLOW CONTROL

In the above description it has been assumed that the various feeding devices have each been adjusted to produce equalized rates of feed so that there will be no tendency toward material accumulation at any point in the system. However, it is one of the features of the present invention that manual intervention is not required to equalize flow rates under changing conditions. Briefly stated, the output rate of the plant is determined by the speed of rotation of the compactor rollers and the degree of compaction which is maintained. Working upwardly through the system, back to the point of feed of the wet raw material, each vessel is provided with a level detector which actuates a controller which correctively controls a feeder located upstream in the path of material flow to keep the level in the vessel automatically at its working level. In other words, each vessel has a level detector which "calls" for material from an upstream point in the flow as needed to keep the material in the vessel at its desired, and most efficient, working level.

Attention will first be given to the means for controlling flow of the material, heated to incipient fusion, to the compactor. For this purpose the compactor 190 has a pressure sensor 240 which determines the force applied between the two rolls and produces a signal to activate a controller 241. The controller tends to maintain constant briquette density by bringing about a corrective increase or decrease in the speed of the drive 181 for the feeder 180. A suitable pressure sensing cell 240 and controller 241, which completes a servo loop, are available commercially from several suppliers. When the pressure between the rolls drops, indicating that insufficient material is being fed, a signal is produced which actuates the controller in a direction to speed up the drive 181, and vice versa.

Assuming that the rate of feed at the feeder 180 increases, this will tend to produce a drop in the body of material contained in the furnace. In carrying out the invention such drop in level is sensed by a level detector 242 which actuates a controller 243, causing a speed-up in the drive 101 which drives the feeder 100 at the outlet of the second heat exchanger 80. This causes loading of material onto the second elevator 110 at a higher rate thereby increasing the rate of replenishment of the furnace 140. Feeder controller 243 also controls the speed of elevator 110 by changing the speed of its motor 133 in proportion to the rate of feed.

The hopper 130 which is positioned between the elevator 110 and the furnace has its own control loop including a level detector 244 which actuates a controller 245 to correctively adjust the drive 132 associated with the feeder 131. This servo loop tends to maintain a constant level of material in the hopper so that when additional material is deposited by the elevator 110, raising the hopper level, this is immediately sensed by the level detector 244 so that material is immediately fed from the hopper to the furnace at a greater rate.

The above mentioned increase in feed from the second heat exchanger to satisfy the requirements of the furnace, results in a drop in level of the material in the second heat exchanger 80 which is sensed by the level detector 246, producing an output signal which activates an associated controller 247 to increase the rate of feed of the feeder 40, at the lower end of the elevator 50 and the speed of the elevator. This produces a higher rate of feed from the elevator so that feed material passes at a greater rate through the screen 60 for replenishment of the second heat exchanger via the feed tube 70.

The greater rate of withdrawal from the first heat exchanger 20, in turn, tends to cause a drop in level in that heat exchanger which is sensed by a level detector 248 which transmits a signal to controller 249 which produces a corrective adjustment in the speed of the drive 11 which drives the wet feed conveyor 10, with the result that the wet feed material is fed at a greater rate for immediate replenishment of the first heat exchanger.

In the above discussion of the progressive automatic control by a series of servo loops, it has been assumed that an increased rate of feed at the compactor has occurred calling for replenishment at successive points in the upstream path of flow. It will, however, be understood by one skilled in the art that the reverse will take place when the needs of the compactor tend to decrease, with an over-pressure condition at the compactor resulting in a cutting down of the flow successively in the upstream position. In a practical case this replenishment, or cutting down, does not take place in a step-by-step fashion as described but, instead, each servo loop tends to establish and maintain an equilibrium condition until the equilibrium tends to be upset in one direction or the other, whereupon corrective action automatically occurs.

While no servo control has been shown for the drive 16 for the dry feed conveyor 15, it will be understood that where a dry feed is fed simultaneously, as will normally be the case, the dry feed conveyor may be equipped with a servo loop under the control of the level detector 246 in the second heat exchanger, so that a drop in the level of such heat exchanger simultaneously increases the rate of feed from the first heat exchanger and the rate of input of the dry feed from outside of the system. Alternatively, where the director 220 is in its position 222, in which the dry and wet feeds are combined, the dry feed drive 16 may be coupled to the wet feed drive 11 for simultaneous control.

PHYSICAL LAYOUT OF PLANT

While the invention as described by a flow diagram in FIG. 3 is not limited to any particular physical arrangement, it is nevertheless one of the important features of the invention that the plant is constructed in a framework in which the two heat exchangers 20, 80 occupy the lowermost positions and the two screens, which are fed by respective elevators from the heat exchangers, occupy the topmost positions, with the furnace occupying an intermediate position, and with the compactors interposed between the furnace and the intermediate temperature heat exchanger. The wet feed conveyor 10 is preferably located at a level above the first heat exchanger and the dry feed conveyor is preferably located at a level above the bottom of the furnace. In this way all of the transport, except that which occurs in the two elevators, is vertically downward under the action of gravity. This greatly simplifies the system since the only transport drives which are required, aside from the input conveyors, are those which are used to drive the elevators.

Preferably the openings in the intermediate temperature screen assembly 120, which is just ahead of the furnace, are larger than the openings in the screen assembly 60, thereby insuring that any materials which pass the low temperature screen 60, and which are smaller than briquette size, are certain to be passed by the intermediate temperature screen for treatment in the furnace, including undersized portions of the briquettes which may break off as a result of physical handling.

While it is one of the features of the present invention that the materials fed into the plant on the inlet conveyors 10, 15, are well mixed within the plant as a result of the mixing actions, of the tumbler type heat exchangers, the furnace, screens and conveying devices, the invention, in one of its aspects, extends beyond the physical plant to encompass the manner in which the raw materials are stored. As stated above, the waste materials from a steel making operation vary widely in type, source, size and composition including metallic iron, oxides of iron, other compounds of iron, coke and other carbonaceous materials. In accordance with one aspect of the present process, these raw materials are not necessarily stored in separate piles but are, instead, deposited on a single pile or reservoir in relatively thin layers. When the materials are scooped for the loading of the input conveyors 10, 15 it is contemplated that the scooping, by a power shovel, front end loader, or the like, will take place in passes across the layers so that each scoop contains a portion of many layers from the pile. This produces an automatic mixing of the available iron and carbon containing components to bring them within the range of tolerance of the present plant and without requiring the provision of a separate, costly, or cumbersome pre-mixing plant. This further adds to the economy of the present system.

ALTERNATE EMBODIMENT

Figure 4:
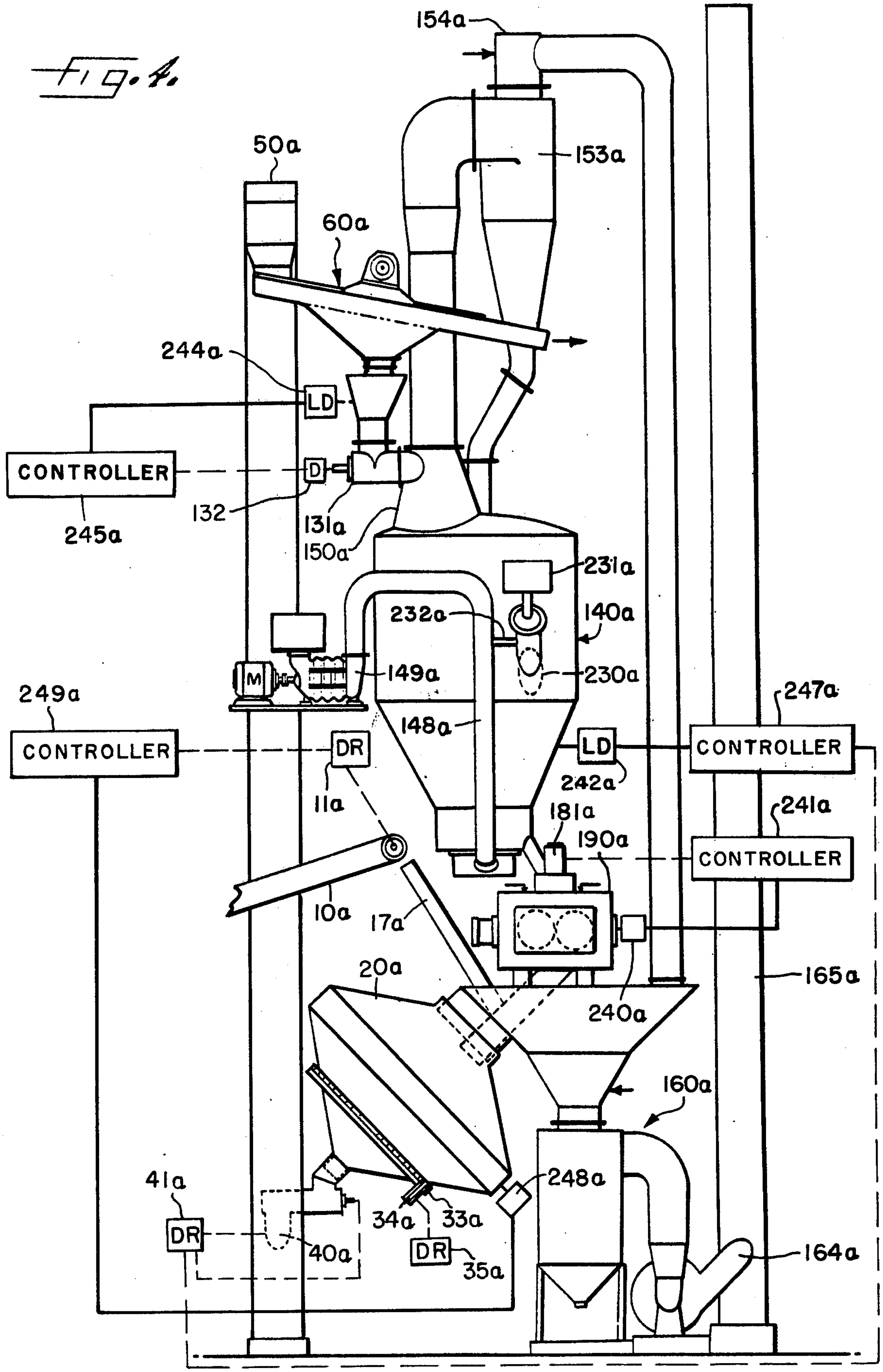
FIG. 4 is an elevational view of a simplified installation employing elements of the present invention.
Figure 5:
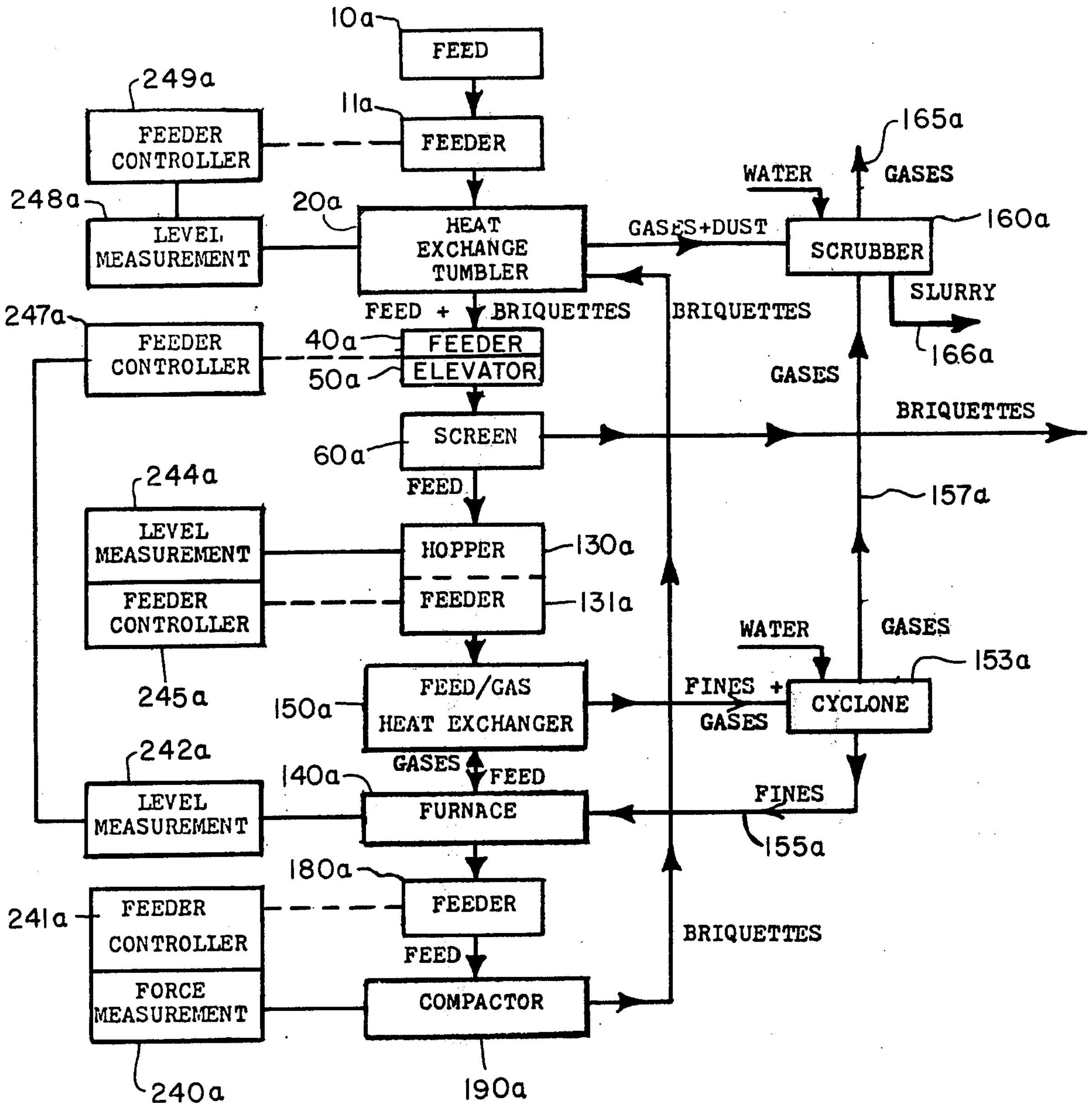
FIG. 5 is a flow diagram corresponding to FIG. 4.

While the present invention has been described in connection with FIGS. 1–3 which show a preferred embodiment employing a two-stage heat exchange cycle in which the briquettes flow counter to the raw material, the invention in its broader aspects is not limited to use of two heat exchangers and a plant may be constructed in simplified form as set forth in FIGS. 4 and 5 without departing from the invention. In this plant, in which similar elements are denoted by similar reference numerals with addition of subscript *a*, it will be noted that the intermediate temperature heat exchanger 80, with its associated feeder 100, elevator 110 and screen 120, has been omitted. Instead, only one heat exchanger 20*a* of the tumbling type is employed which takes raw material directly from the wet feed conveyor 10*a* and which takes the briquettes directly from the compactor 190*a*. It will be understood that the features of automatic control are the same. This plant design may be preferable to that of the more complex plant in the following cases: (1) when the material fed contains so much water that the briquettes are sufficiently cooled in one heat exchanger, (2) when the feed material softens and is briquetted at such a low temperature that 2-stage heat exchange is not justified and (3) when the tonnage to be processed is too low to justify the more expensive plant, even though the fuel consumption might be greater.

While the embodiments of the present invention illustrated were designed primarily to operate using as raw material the waste and screenings in the form of iron oxide together with combustible elements in the form of carbon and hydrocarbons produced in the normal operation of a steel plant, the invention may be employed in the briquetting of particulate materials from a number of different sources. Indeed, the present invention may be utilized in hot briquetting many materials, including iron ore fines and concentrates, chrome ore fines, ferromanganese screenings, metal chips, phosphate rock, mixtures of raw materials for glass and portland cement manufacture, and other materials and mixtures that soften at temperatures at least as high as 2000° F. In many such applications, the plants illustrated in FIGS. 1–5 could be used with little or no alteration. Also while the term "briquette" has been used to designate the end product, and while such term is intended primarily to describe dense, pillow shaped pellets of consistent size, it will be understood that the term "briquette" is by no mean limited to production of pellets of equal size and consequently it shall be interpreted to cover irregular of broken pieces or granules of material produced by compaction in continuous strip form and then broken or crushed and screened to the desired size.

ALTERNATE ANTI-POLLUTION EMBODIMENTS

Figure 6:
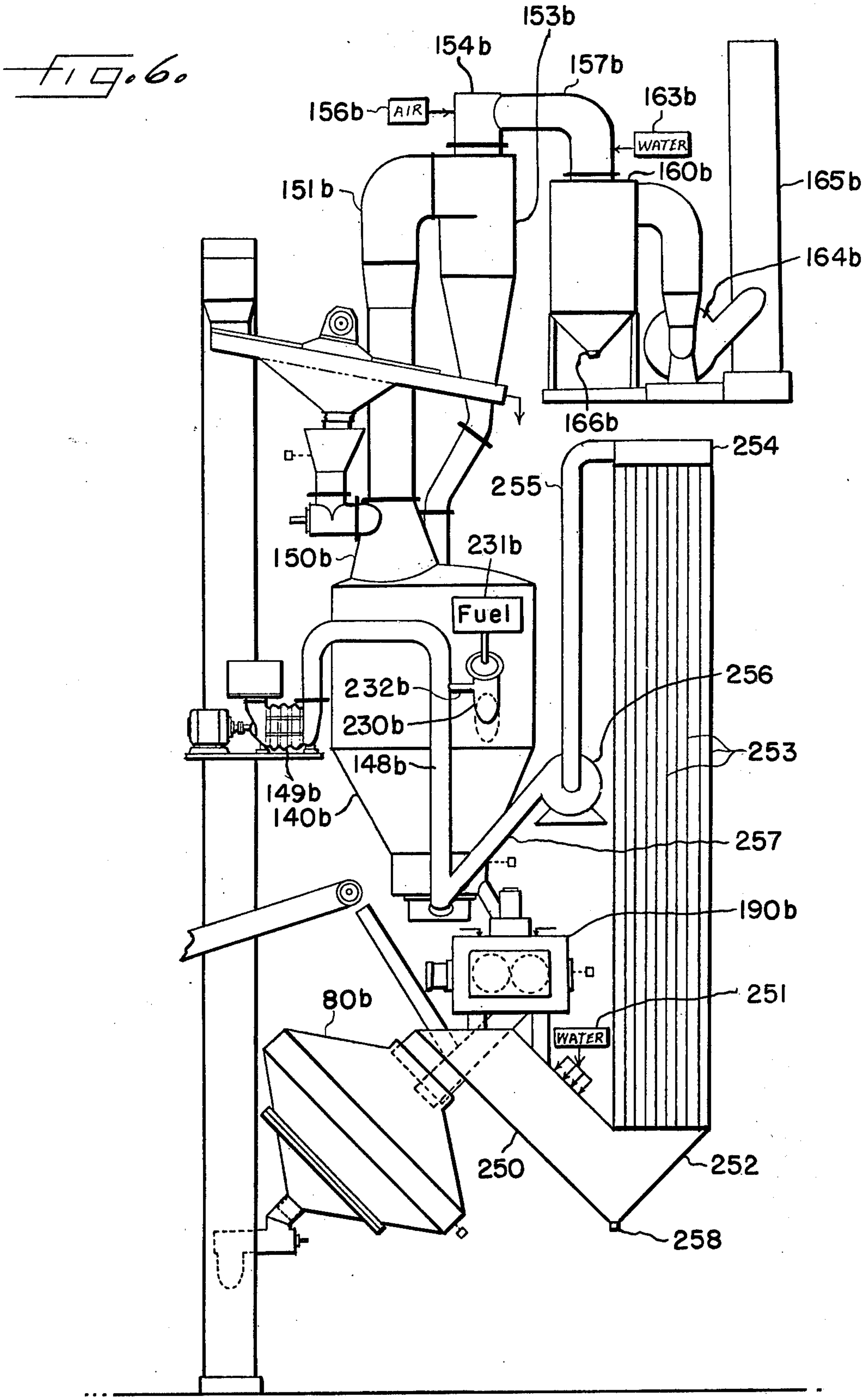
FIG. 6 is a view similar to FIG. 4 but with modified features.
Figure 7:
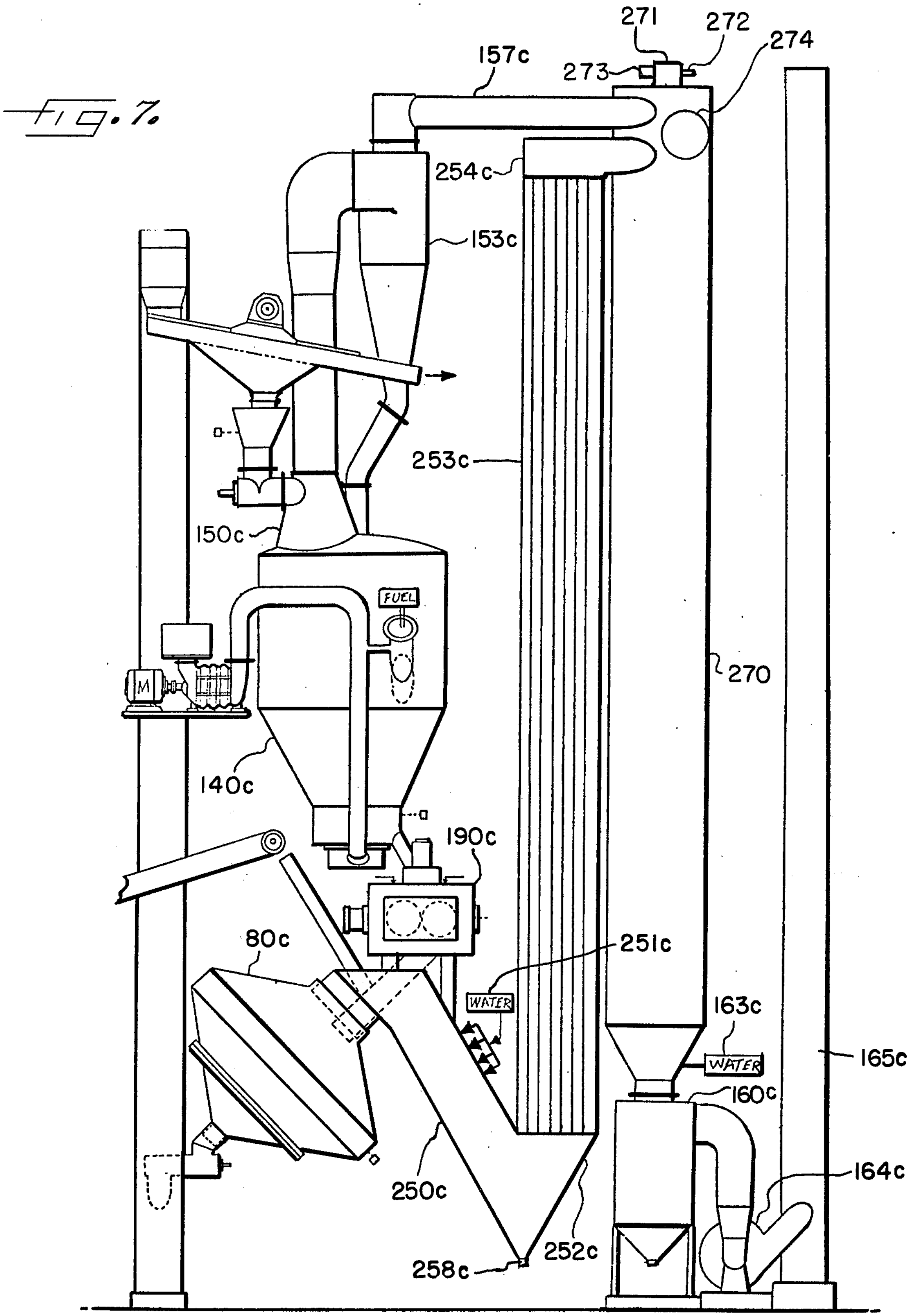
FIG. 7 is a view similar to FIG. 6 but with still further modifications.

While the anti-pollution means described in connection with the embodiments set forth in FIGS. 1–5 are adequate for many materials and will meet the pollution standards for a number of plant locations, even more elaborate anti-pollution equipment may be required for processing some materials and for locations having unusually stringent pollution limitations. Two equipment arrangements involving more extensive means for pollution control are shown in FIGS. 6 and 7, which are modifications of the arrangement set forth in FIG. 4. In both arrangements, all off gases are passed through a combustion zone for removal of combustible contaminants, such as oil vapors and carbon monoxide, prior to being scrubbed and discharged to atmosphere. Both arrangements include optional condensers for removing moisture from the gases prior to entering the combustion chamber, so as to reduce the consumption of fuel and the size of combustion and scrubbing equipment when economically justified.

The arrangement illustrated in FIG. 6 is intended for applications in which the feed to the plant contains a relatively low percentage of objectionable hydrocarbons having a low boiling point or in which the feed contains an excess of solid fuels that would provide a low-cost source of the additional heat required. In the arrangement of FIG. 6 (in which corresponding reference numerals are employed with addition of subscript *b*) the scrubber 160*b* has been moved from its previous location (FIG. 4) at the gas outlet of the heat exchange tumbler 80*b* to a position near the outlet of the cyclone separator 153*b*, and a condenser 253 has been added at the outlet of the tumbler 80*b*. In this arrangement, the off gases from the tumbler 80*b*, compactor 190*b* and miscellaneous sources (not shown) are collected by hood 250 into which water 251 is optionally sprayed to minimize dust entering the condenser 253 by way of inlet header 252. The condenser may be cooled with air or water, as desired. The gases exit the condenser by way of outlet header 254 and duct 255 and are injected into the bottom of the fluid bed reactor 140*b*, by means of a blower 256 and duct 257, together with fluidizing air from blower 149*b* and duct 148*b*. The gases from the furnace 140*b* flow through optional gas/feed heat exchanger 150*b*, then duct 151*b* and cyclone separator 153*b*. Air 156*b* is optionally introduced into the off-gases at the gas outlet 154*b* of the cyclone to burn any small amounts of carbon monoxide or hydrocarbons in the gas, which flow through duct 157*b* into scrubber 160*b*, which is supplied with water 163*b*. The effluent gases are then exhausted to atmosphere by blower 164*b* through stack 165*b*. Slurry and condensate are drained from the scrubber 160*b* and condenser 253 through connections 166*b* and 258.

The arrangement shown in FIG. 7 is applicable to feed materials having a relatively large amount of volatile fuel difficult to remove by scrubbing in standard equipment. In this arrangement, the gases from the tumbler 80*c*, compactor 190*c* and miscellaneous sources are processed in an optional condenser 253*c* having features similar to those described for the condenser 253 of FIG. 6. The gases from condenser 235*c* pass through a head 254*c* which discharges into the top of an afterburner 270. The off gases from the furnace 140*c* also enter the top of the afterburner, after passing through the feed/gas heat exchanger 150*c*, cyclone separator 153*c* and duct 157*c*. The afterburner is equipped with a burner 271 at the top to preheat the unit and to supply heat as required to cause complete combustion of all combustible matter in the gases. The burner has suitable sources of fuel 272 and air 273, and secondary air is supplied to the afterburner at inlet 274. The burner and secondary air supply are controlled by standard regulating devices to maintain the afterburner at the proper temperature. The afterburner is refractory lined and insulated. The effluent gases pass from the afterburner to the scrubber 160*c*, which is supplied with water 163*c* for removing entrained particulate matter, and then through exhauster 164*c* and stack 165*c* to the atmosphere. Although the simplified plant design of FIG. 4 has been used to illustrate these anti-pollution means, such means are equally applicable to other plant designs that employ the present invention, including the design shown in FIG. 1.

I claim:

1. A plant for hot briquetting feed material consisting of particulate materials containing heat-softenable matter and for cooling the resulting briquettes comprising, in combination, a low temperature feed/briquette heat exchanger in the form of a tumbler having an input and an output, a low temperature screen at the output, an intermediate temperature feed/briquette heat exchanger in the form of a tumbler having an input and an output and an intermediate temperature screen at the output, a furnace in the form of a fluid bed reactor having an input and an output, a roll type compactor at the output of the furnace, means for feeding the feed material to the plant in succession through the low and intermediate temperature heat exchangers and thence into the furnace, means for feeding hot briquettes from the compactor in succession through the intermediate and low temperature heat exchangers for progressive heating of the feed material and for discharge of the briquettes from the low temperature screen in substantially cooled condition.

2. The combination as claimed in claim 1 in which a further heat exchanger is provided at the inlet to the furnace for temporarily mixing the off gas from the furnace with the incoming feed material for the purpose of bringing the feed more nearly to furnace temperature and reducing the temperature of the off gas.

3. The combination as claimed in claim 1 in which each of the tumblers is of the inclined conical type, the shell of which consists of a lower section of hollow cone shape and an upper mated section that serves as a cover, the sections having a common axis and joined together at their bases and in which the inlet and outlet are at the apexes of the respective upper and lower sections, the tumblers having drive means for rotating the same slowly about their axes for intimate mixing of the feed material and briquettes with discharge of the latter downwardly from the outlet and with exiting of any evolved gas upwardly from the inlet.

4. The combination as claimed in claim 1 in which the feed material includes combustible matter and in which means are provided for supplying air under pressure below the bed of the fluid bed reactor to keep the bed fluidized and to heat the bed by oxidation of the combustible matter.

5. The combination as claimed in claim 1 in which the compactor includes high temperature feeding, compacting and discharge zones defined by inlet and outlet nips, an inner enclosure surrounding only the feeding, compacting and discharge zones of the compactor, an outer enclosure surrounding the compactor rolls to define, with the inner enclosure, an interspace, and means for injection of water into the interspace to maintain the compactor rolls at a safely low teperature.

6. The combination as claimed in claim 1 in which means are provided for constantly determining the force applied to the feed material by the rolls of the compactor, an adjustable feeder between the furnace and the compactor, a controller interposed between the force measuring device and the feeder responsive to the force measuring device for corrective adjustment of the feed thereby to maintain the force between the rolls of the compactor substantially at a predetermined level.

7. The combination as claimed in claim 1 in which an adjustable low temperature feeder is interposed between the low and intermediate temperature heat exchangers and in which an adjustable intermediate temperature feeder is interposed between the intermediate temperature heat exchanger and the furnace, means for constantly measuring the level of material in the furnace, a first controller responsive to the level of the material in the furnace for correctively adjusting the intermediate temperature feeder, means for constantly measuring the level of the material in the intermediate temperature heat exchanger, and a second controller responsive to the level of material in the intermediate temperature heat exchanger for correctively adjusting the low temperature feeder.

8. The combination as claimed in claim 7 in which the feeding means includes an adjustable feed material input feeder, means for constantly measuring the level of material in the low temperature heat exchanger and a controller responsive to the level in the low temperature heat exchanger for correctively adjusting the input feeder.

9. The combination as claimed in claim 1 in which the tumblers are located at a low level and in which the screens associated therewith are located at a high level, the tumblers and screens being interconnected by respective vertical elevators, the briquettes and feed materials acted upon by the screens being fed downwardly from the screens by action of gravity.

10. The combination as claimed in claim 9 in which means are provided for varying the speed of each elevator, the speed varying means being coupled to the controller that regulates its input feeder for varying the speeds of the elevator and its feeder in unison.

11. The combination as claimed in claim 1 in which the intermediate temperature heat exchanger is located at a low level and in which the screen associated therewith is located at a high level with the furnace being located at a level in between, an elevator interconnecting the intermediate temperature heat exchanger and its associated screen, and means for conducting the material from such screen downwardly by gravity into the furnace.

12. The combination as claimed in claim 11 in which the conducting means is in the form of a hopper having a feeder at the lower end thereof, means for constantly measuring the level of material in the hopper, and means responsive to the level of the material in the hopper for correctively controlling the feeder thereby to maintain a substantially constant level of material in the hopper.

13. The combination as claimed in claim 1 in which a feed/gas heat exchanger is provided at the inlet of the furnace, the feed/gas heat exchanger having means for feeding the heated feed material from the intermediate temperature screen into the furnace inlet at the top of the furnace, the furnace having a stack at the point of feeding so that the off gas from the furnace flows counter to the incoming feed material to heat the latter more nearly to the temperature of the furnace and to cool the gas more nearly to the temperature of the feed material, a cyclone separator coupled to the stack, means for conducting the fines from the separator by gravity back into the furnace, a scrubber, and means for conducting the off gas from the cyclone separator to the scrubber.

14. The combination as claimed in claim 11 in which a feed tube extends downwardly from the intermediate temperature screen to the inlet of the low temperature heat exchanger for transferring the compacted briquettes to the latter, a feeder at the lower end of the feed tube, a level detector at the upper end of the feed tube, and a controller responsive to the level detector for operating the feeder so as to maintain the feed tube substantially full of briquettes so that the briquettes are lowered from the elevated intermediate temperature screen to the low temperature heat exchanger gently and free of breakage.

15. The combination as claimed in claim 1 in which the intermediate temperature screen is of the inclined static grizzly type and the low temperature screen is of the vibratory type and in which the openings in the intermediate temperature screen are larger than the openings in the low temperature screen thereby to insure that all particles passing through the low temperature screen will be able to pass through the intermediate screen to the furnace.

16. The combination as claimed in claim 13 in which the furnace stack is constricted at the top and flared downwardly toward the bottom in a frustoconical shape to produce an off gas velocity which is sufficient to disperse the incoming feed material causing the finer elements of the feed material to be entrained and carried upwardly to the stack and into the separator while the more coarse abrasive elements flow downwardly in heat exchanging relation and counter to the stream of off gas directly into the furnace.

17. The combination as claimed in claim 1 including a source of wet feed material and dry feed material, means for feeding the wet feed material to the low temperature heat exchanger, and switchable means for feeding the dry feed material (a) to the intermediate temperature heat exchanger and (b) alternatively to the low temperature heat exchanger.

18. The combination as claimed in claim 17 in which the switchable means includes provision for feed of the dry feed material directly to the furnace, thereby bypassing the low temperature heat exchanger and intermediate temperature heat exchanger under conditions of start-up, and means for feeding auxiliary fuel to the furnace under conditions of start-up and until a substantial quantity of hot briquettes exists in the heat exchangers.

19. The combination as claimed in claim 1 including a source of water and means for spraying water from the source into the low temperature heat exchanger for maintaining the temperature of the low temperature heat exchanger below the level at which any oil in the feed material will be vaporized, the temperature in the intermediate temperature heat exchanger being sufficiently high to vaporize the oil from the waste and means for reclaiming the oil from the vapors.

20. The combination as claimed in claim 19 in which means are provided for measuring the temperature of the low temperature heat exchanger and in which a temperature responsive controller is provided for the water for corrective addition of water to maintain the temperature below the vaporization temperature of oil.

21. The combination as claimed in claim 13 in which a scrubber having a flue is provided and in which the off gases from the cyclone and the heat exchangers are passed through the scrubber for removal of residual pollutants before discharge into the flue.

22. The combination as claimed in claim 13 in which air is mixed with the off gas from the cyclone separator at a sufficient rate to oxidize any combustible matter such as carbon monoxide or hydrocarbons in the off gas.

23. A system for hot briquetting particulate feed material containing heat-softenable matter and for cooling the resulting briquettes which comprises a fluid bed furnace having an inlet at the top and an outlet at the bottom for utilizing the heat of combustion to raise the temperature of the residue to the point of incipient fusion, a compactor coupled to the outlet of the furnace for compacting the residue into briquettes, an enclosed cone type tumbler-heat exchanger having an inclined axis and with an axial inlet at the top and an axial outlet at the bottom together with means for slowly rotating the same, the inlet being coupled to the compactor for receiving hot briquettes therefrom, means for conveying feed material to the inlet of the heat exchanger for mixing with the briquettes so that the briquettes are cooled and the feed material is heated, a screen assembly for separating the cooled briquettes from the heated feed material, a conveyor for coupling the outlet of the heat exchanger to he screen for conveying briquettes and feed material thereto, means for conveying the briquettes from the top of the screen and means for conveying the heated feed material from the bottom of the screen to the inlet of the furnace.

24. A system for hot briquetting of particulate feed material containing heat-softenable matter which comprises a vertical frame, a furnace in the central region of the vertical frame, the furnace being of the fluid bed type having an inlet at the top and an outlet at the bottom for heating the feed material to form a residue raised to a temperature of incipient fusion, a roll type compactor arranged below the outlet of the furnace for receiving the residue and for compacting it under high pressure to form briquettes, a cone type heat exchanger-tumbler located below the outlet of the compactor for receiving the briquettes, the heat exchanger-tumbler having an inclined axis with an axial inlet at the top and an axial outlet at the bottom as well as drive means for slowly rotating the same, means for conveying feed material to the inlet of the heat exchanger-tumbler so that the feed material is heated and so that the briquettes are cooled, a vertically arranged bucket elevator extending substantially from the bottom of the top of the frame, the elevator being coupled at its lower end to the outlet of the heat exchanger-tumbler so that each bucket receives a uniform mixture of briquettes and feed material, means for driving the elevator so that the process of heat exchange continues in the buckets as the buckets are elevated to the top of the frame, a screen assembly at the top of the frame for separating the briquettes from the heated feed material, means for dumping the buckets into the screen assembly so that the briquettes are discharged in a relatively cooled state and so that the heated feed material falls though the screen, means for feeding the material from the underside of the screen to the inlet of the furnace, and a feed/gas heat exchanger interposed at the inlet of the furnace for bringing the off gas from the furnace into contact with the heated feed material for further heating of the feed material to a temperature more nearly approaching the temperature of the furnace, and for cooling the off gas to a temperature more nearly approaching the temperature of the feed material, and means for subsequently purifying the off gases from the furnace and the heat exchanger-tumbler for discharge into the atmosphere.

25. The combination as claimed in claim 24 in which the feed/gas heat exchanger is a vertical stack of frustoconical shape so proportioned that the velocity of the off gas increases as it rises sufficient to entrain at least the finer particles of the incoming feed material while the coarser and heavier particles fall into the furnace counter current to the flow of off gas, a cyclone type separator having its upper end coupled to the top of the stack and having its lower end connected to the top of the furnace so that the entrained particles of feed material are deposited by gravity and at an augmented temperature back into the furnace.

26. The combination as claimed in claim 24 in which a variable feeding device is interposed between the furnace and the compactor, means coupled to the feeding device for constantly determining compaction force and for making a corrective change in the rate of feed, a second variable feeding means interposed between the heat exchanger tumbler and the furnace, level measuring means coupled to the second feeding means for constantly measuring the level of the material in the furnace for making a corrective change in the rate at which feed material is fed to the inlet of the furnace for maintaining a substantially constant level therein, and third variable feeding means interposed between the feed material conveyor and the heat exchanger means, and level measuring means coupled to the third feeding means for measuring the level of material in the heat exchanger-tumbler and for making a corrective change in the rate at which feed material is fed to the heat exchanger-tumbler for maintaining a substantially constant level therein.

27. The combination as claimed in claim 23 in which the tumbler is formed of a hollow conical bottom portion and a totally enclosed top, the tumbler having an angle of inclination, with respect to the horizontal, on the order of 35°–55° and conical included angle of at least 90°, with the driving means rotating the heat exchanger-tumbler at a rate of between 0.2 and 2.0 rpm.

28. The combination as claimed in claim 1 which includes a source of wet feed material and a source of dry feed material, means for conveying the wet feed material to the low temperature heat exchanger and means for selectively conveying the dry feed material alternatively (a) to the intermediate temperature heat exchanger, (b) to the low temperature heat exchanger and (c) directly to the furnace.

29. A hot briquetting plant for the making of briquettes from particulate feed material containing heat-softenable matter which comprises a first tumbler type heat exchanger having an axial inlet at the top and an axial outlet at the bottom, a first elevated screen, a first bucket type elevator for coupling together the outlet of the first heat exchanger and the screen, a second tumbler type heat exchanger having an axial inlet at the top and an axial outlet at the bottom, a second elevated screen, a second bucket type elevator for coupling the outlet of the second heat exchanger with the second screen, a fluid bed furnace having an inlet at the top and an outlet at the bottom together with means for furnishing air and fuel to the bottom of the furnace to provide a residue heated to a temperature of incipient fusion, a roll type compactor having an inlet and an outlet, with the inlet being coupled to the outlet of the furnace for compacting the residue into briquettes, a first feed tube for coupling together the underside of the first screen to the inlet of the second heat exchanger, a second feed tube for coupling the upper side of the second screen to the inlet of the first heat exchanger, means for coupling the underside of the second screen to the furnace inlet, and means for feeding the feed material to the inlet of the first heat exchanger, the tumbler type heat exchangers both being of conical construction and including a hollow lower cone having an included angle of at least about 90° and having a cover for totally enclosing same, and a driving means for producing slow rotation, the axis being inclined on the general order of 45° so that the material entering the inlet of the heat exchanger is subjected to cascading action and so that the material exiting at the outlet is drawn from widely separated regions within the heat exchanger.

30. The combination as claimed in claim 29 in which the off gas from the furnace escapes through the furnace inlet thereby to entrain at least a portion of the feed material entering the furnace so that the entrained material is kept in contact with the off gas to increase the temperature thereof while reducing the off gas temperature, and a cyclone type separator for receiving the off gas and material entrained therein, the lower end of the separator being coupled to the furnace for returning the entrained material thereto, and means for purifying the off gas from the separator prior to return of the off gas to the atmosphere.

31. A briquetting plant for briquetting particulate feed material containing heat-softenable matter and combustible elements comprising, in combination, a source of wet feed material, a source of dry feed material, first and second tumbler type heat exchangers, means for feeding the wet feed material to the first heat exchanger and the dry feed material to the second, first and second screens coupled to the outlets of the respective heat exchangers, the underside of the first screen being in communication with the second heat exchanger, a furnace of the fluid bed type having an inlet at the top and an outlet at the bottom, the inlet being in communication with the underside of the second screen so that the feed material fed serially through the heat exchangers is deposited into the furnace and the combustible matter is burned therein to produce a residue of feed material in a stte of incipient fusion, a roll type compactor at the outlet of the furnace for compacting the residue into briquettes, and means for feeding the briquettes reversely through the second and first heat exchangers to produce a two-step cooling of the briquettes and a two-step increment in the temperature of the feed material prior to its entry into the furnace, and a third heat exchanger located at the inlet of the furnace for contacting the feed material entering the furnace with the furnace off gas thereby to provide a third increment of heat to the feed material prior to burning thereof in the furnace with the result that the combustible elements in the waste provide substantially all of the heat that is necessary for burning thereby saving the cost of auxiliary fuel.

32. The combination as claimed in claim 31 in which a flue is provided for the off gases from the furnace and from the first heat exchanger, and means for adding auxiliary water to the first heat exchanger for cooling of the briquettes discharged therefrom and for maintaining the temperature of the first heat exchanger at below the volatilization temperature of any oil contained in the feed material so that such oil is carried over into the second heat exchanger rather than being discharged in vapor form through the flue and into the atmosphere.

33. The combination as claimed in claim 24 in which an afterburner having a heating means is provided and in which the off gas from the cyclone and the heat exchanger-tumbler is passed first through the afterburner for oxidation of combustible matter and then through the scrubber for removal of residual pollutants before discharge.

34. The combination as claimed in claim 33 in which a condenser having a cooling means is provided and in which the off gas from the heat exchanger-tumbler passes through the condenser for removal of water vapor as condensate before entering the afterburner.

35. The combination as claimed in claim 24 in which the off gas from the heat exchanger-tumbler is injected into the fluid bed for oxidation of combustible matter in the off gas.

36. The combination as claimed in claim 35 in which a condenser having a cooling means is provided and in which the off gas from the heat exchanger-tumbler passes through the condenser for removal of water vapor as condensate before entering the furnace.

37. The combination as claimed in claim 1 in which the temperature of the low temperature feed/briquette heat exchanger is sufficiently low so that the off gas therefrom consists primarily of water vapor and in which the temperature of the intermediate temperature feed/briquette heat exchanger is at a sufficiently higher level so that the off gas consists primarily of oil vapor and in which the temperature of the furnace is sufficiently high that the off gas therefrom consists primarily of combustion products, means for burning the oil and other combustible matter contained in the off gases, means for scrubbing the particulate matter and other pollutants from the off gases and for subsequently discharging the gases to the atmosphere.

* * * * *